United States Patent [19]

Akiyama

[11] Patent Number: 4,855,990
[45] Date of Patent: Aug. 8, 1989

[54] DISC PLAYER

[75] Inventor: Hiroo Akiyama, Hamamatsu, Japan

[73] Assignee: Nippon Gakki Seizo Kabushiki Kaisha, Hamamatsu, Japan

[21] Appl. No.: 21,323

[22] Filed: Mar. 3, 1987

[30] Foreign Application Priority Data

Mar. 10, 1986 [JP] Japan .................................. 61-52051
Mar. 10, 1986 [JP] Japan .................................. 61-52052
Mar. 10, 1986 [JP] Japan .................................. 61-52054

[51] Int. Cl.$^4$ ........................ G11B 25/04; G11B 17/02
[52] U.S. Cl. .................................... 369/265; 369/270
[58] Field of Search ................. 369/264, 65, 270, 263, 369/271, 77.1

[56] References Cited

U.S. PATENT DOCUMENTS

| | | | |
|---|---|---|---|
| 4,232,870 | 11/1980 | Iemenschot | 369/270 |
| 4,541,086 | 9/1985 | Tanaka | 369/271 |
| 4,731,779 | 3/1988 | Mathunaga | 369/270 |

Primary Examiner—Stuart S. Levy
Assistant Examiner—Steven M. duBois
Attorney, Agent, or Firm—Darby & Darby

[57] ABSTRACT

A disc player, for playing various information carrier discs, which includes, a single turntable for supporting an information carrier disc, a single drive motor for rotating the turntable, and a reproducing head device for reading signals recorded on the disc. The drive motor has a motor body and a rotation shaft, and is attached at its rotation shaft directly to the turntable with its motor body spaced apart from the turntable. Therefore, a clearance is formed between the motor body and the turntable. The reproducing head device is radially transferrable relative to the turntable. When the reproducing head device is transferred to its innermost position where it reads the signals recorded on the inner periphery of the information area of the disc, it is positioned in the clearance without butting against either the motor body or the turntable.

15 Claims, 8 Drawing Sheets

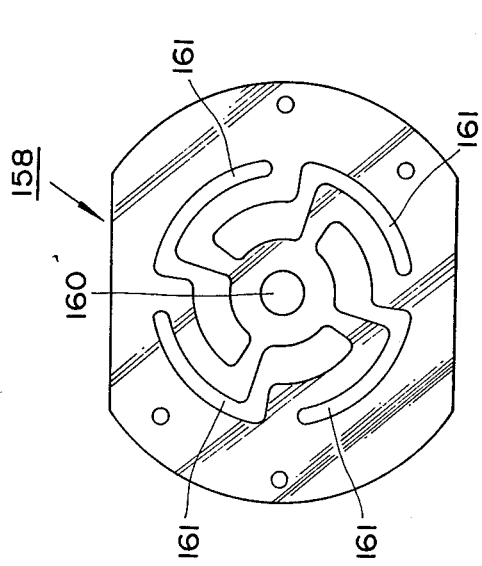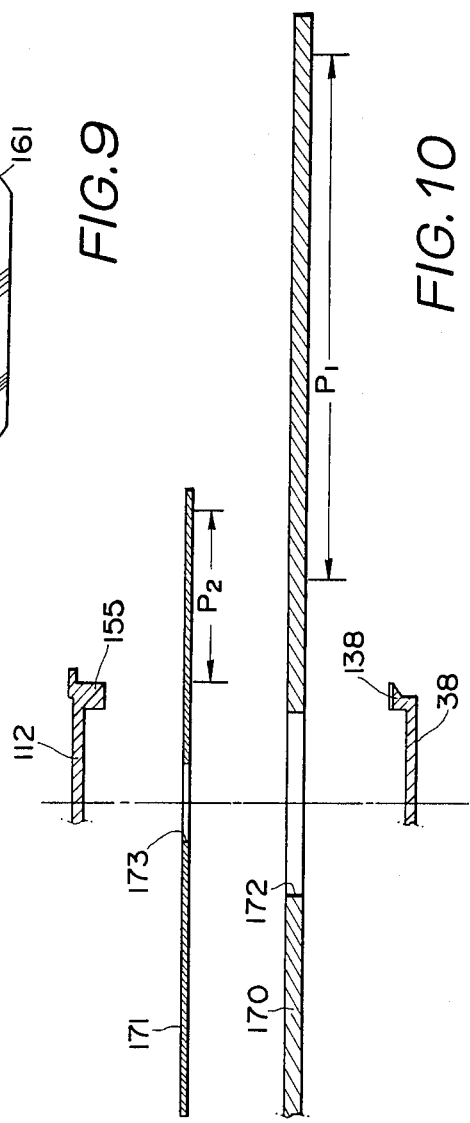

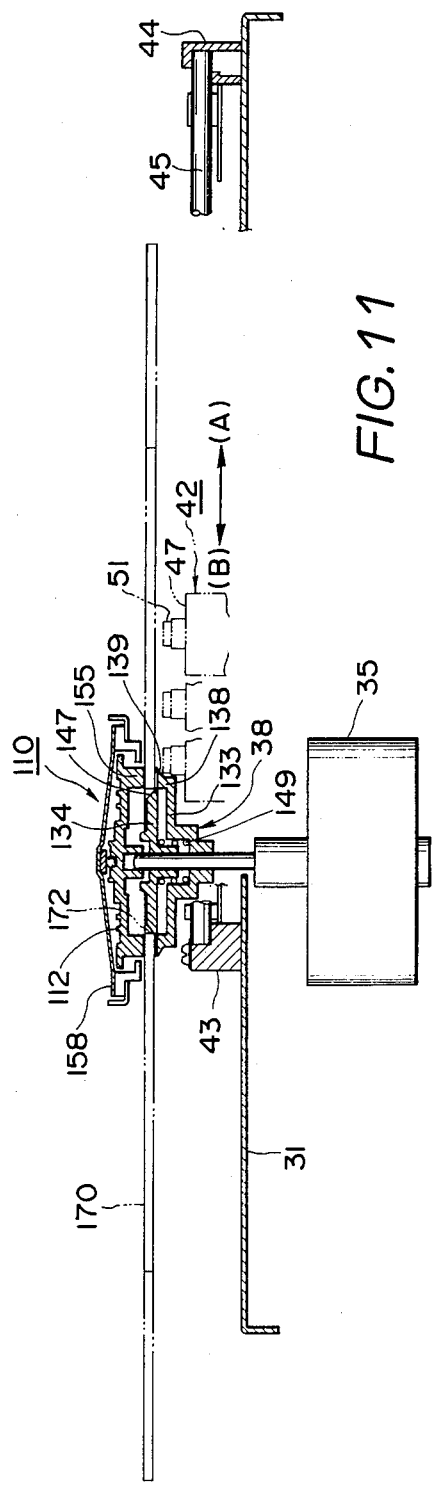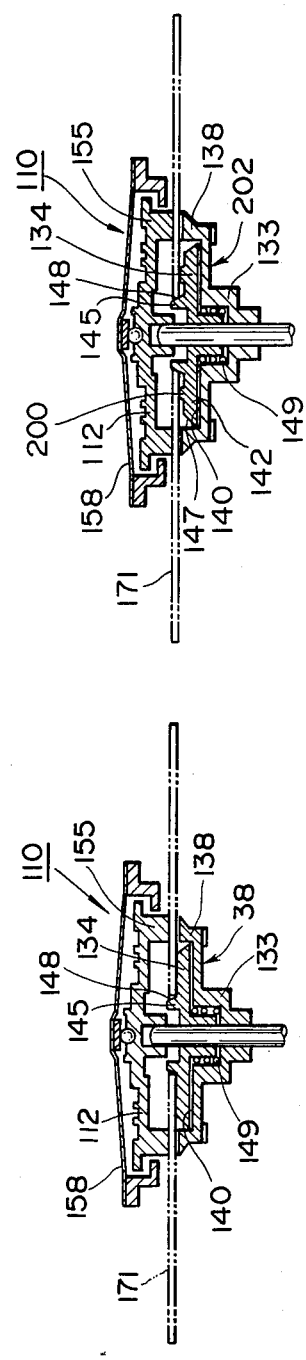

DISC PLAYER

BACKGROUND OF THE INVENTION

The present invention relates to a disc player having a single turntable and a single drive motor which can receive and rotate various types of information carrier discs having different diameters, such as digital audio discs manufactured according to the compact disc digital audio system standard and video discs manufactured according to the laser vision standard.

In the prior art, Japanese Utility Model Preliminary Publication No. sho 60-106280 discloses an example of a disc player which can receive several types of information carrier discs having different diameters. As shown in FIG. 1, this conventional disc player has a chassis 1 on which a bracket 2 is attached. A mount segment 3 is pivotally connected at its corner 3a to the bracket 2 via a pin 4 for the movement in the direction indicated by the double-headed arrow (E)(F). This mount segment 3 is provided at that portion of its arcuate edge near the corner 3b, with a drive motor 5 for rotating a disc having a large diameter, and at that portion of its arcuate edge near the corner 3c, with another drive motor 6 for rotating a disc having a relatively small diameter. A turntable 7 for supporting the larger disc is attached to the rotation shaft of the drive motor 5, and a turntable 8 for supporting the smaller disc is fixed to the rotation shaft of the drive motor 6. The mount segment 3 has an arcuate rack 9 formed along its arcuate edge. With this rack 9, a pinion 10 is meshed. The pinion 10 is born by the casing (not shown) of the player and connected to another motor supported by the chassis 1. When the pinion 10 is rotated, the mount segment 3 is pivoted in the direction (E) or (F). As shown in FIG. 1, when the mount segment 3 is pivoted in the direction (E) to its left most position, a pin 11 on the segment 3 contacts with the stopper 12 on the chassis 1, and the axis of the turntable 7 coincides with a vertical base line 13. On the other hand, when the mount segment is pivoted in the direction (F) to its right most position, another pin 14 on the segment 3 contacts with another stopper (not shown) on the chassis 1, and the axis of the turntable 8 coincides with the base line 13. When the axis of either of the turntables 7 and 8 coincides with the base line 13, the turntable 7 or 8 is ready to receive and rotate the disc. That is, in order to receive the discs having different diameters, this disc player has the two turntables 7 and 8 for supporting the discs, the two drive motors 5 and 6 for rotating the turntables 7 and 8 respectively, and the rack 9 and the others, i.e., a mechanism for switching the turntables 7 and 8. This results in a costly, over sized disc player.

In order to make the above-described conventional disc player simple, compact and less costly, one of the turntables 7 and 8, and one of the drive motors 5 and 6 should be omitted. However, in designing a disc player having a single turntable and a single drive motor and still capable of playing discs having different diameters, there arises many problems because of the difference in the manufacturing standards of the various discs.

For example, there arises a problem with the drive motor in creating a disc player for both audio and video discs. The audio disc has an outer diameter of 120 mm, a thickness of 1.2 mm and a weight of 20 g. The video disc has an outer diameter of 300 mm, a thickness of 2.5 mm and a weight of 200 g. The digital audio disc must be driven at a revolution of 200 to 500 rpm, and the video disc, in this case the standard video disc of the constant angular velocity type, must be driven at a revolution of about 1800 rpm. The inertia force generated by a disc is in proportion to the radius of the disc to the fourth power. Furthermore, during the rotation, the video disc takes more windage loss than the digital audio disc. Hence approximately 150 to 200 gf·cm (1.47 to 1.96 N·cm) more torque is necessary for rotating the video disc, though these may be ignored for rotating the digital audio disc. In short, a drive motor for use in the disc player for both audio and video discs is required to have a performance such that the drive motor generates about 40 times as much large torque as a motor for the digital audio disc, and such that the rotating characteristic of the drive motor is stable enough to drive the digital audio disc which must be driven much slower than the video disc. However, those drive motors which satisfy both the large torque and the stable rotating characteristic are so large that anyone of them potentially butts against a reproducing head of the disc player when the reproducing head is transferred in the vicinity of the drive motor. The reproducing head is a device for reading the signals recorded on an information carrier disc, and thus as shown in FIG. 2, the objective lens 15 of the reproducing head 16 must be radially transferred to the position directly under the inner periphery of the information area of the disc 17, that is, the position in close proximity to the turntable (8). The information area is an annular area on an information carrier disc where information signals are recorded. In case of the digital audio disc, the periphery of the information area locates at a radial distance of 25 mm from the center of the disc.

Another example is the problem arising with the turntable. The digital audio disc has a central aperture having a diameter of 15 mm, and an information area having an inner diameter of 50 mm. The video disc has a central aperture having a diameter of 35 mm, and an information area having an inner diameter of 110 mm. The central aperture is a circular hole which is utilized for positioning the disc on the turntable. According to the sizes of these diameters of the apertures and inner diameters of the information areas, the optimum diameter of a turntable for the audio disc is in the range of 15 to 33 mm, and that of the video disc is in the range of 35 to 83 mm. However, a turntable for both the audio and video discs must have a diameter larger than 35 mm. That is to say, the turntable of this size has a potential for causing physical and optical interferences between itself and the reproducing head when the reproducing head detects the inner periphery of the information area of the digital audio disc.

Still another example is the problem arising with the means for centering the discs on the turntable. In case of the conventional disc player in FIG. 1, the turntables 7 and 8 have circular mound portions 7a and 8a respectively for centering discs on them. The mound portion 7a has a large diameter suitable for fitting in the central aperture of the video disc, and the mound portion 8a has a relatively small diameter proper to fitting in the central aperture of the audio disc. However, it is not easy to provide two centering members having different diameters on a single turntable while maintaining the turntable capable of supporting the discs.

SUMMARY OF THE INVENTION

Accordingly, it is an object of the present invention to provide a disc player which is capable of playing various information carrier discs having different diameters, and is still compact, simple-structured and uncostly.

Another object of the present invention is to provide a disc player which is capable of centering on its turntable various discs having different sized central aperture.

With these and other objects in view, one aspect of the present invention is directed to a disc player comprising a single turntable for supporting an information carrier disc, a single drive motor for rotating the turntable, and reproducing means for reading signals recorded on the disc. The drive motor has a motor body and a rotation shaft, and is attached at its rotation shaft directly to the turntable with its motor body spaced apart from the turntable. Therefore, a first clearance is formed between the motor body and the turntable. The reproducing means is radially transferrable relative to the turntable. When the reproducing means is transferred to its innermost position where it reads the signals recorded on the inner periphery of the information area of the disc, it is positioned in the first clearance without butting against either the motor body or the turntable.

A plate-like chassis may be included in the disc player. The chassis carries the motor body on its one face, and has an elongated opening extending along the transference route of the reproducing means. The elongated opening allows the reproducing means to be transferred within it, and also allows the rotation shaft of the drive motor to pass through it. The end portion of the rotation shaft protrudes over the other face of the chassis and reaches to the turntable. A spacer member may also be included in the disc player. The spacer member is interposed between the one face of the chassis and the motor body so that a second clearance is formed between the chassis and the motor body.

The turntable has a top face on which the disc is to be placed, and a bottom face facing the motor body of the drive motor. It is preferred that the peripheral face of the turntable tapers toward the motor body of the drive motor so that the diameter of the turntable decreases gradually from the top face of the turntable to the bottom face thereof. Preferably, the largest diameter of the turntable is slightly smaller than the inner diameter of the information area of the disc.

The turntable may include a centering member of a unitary construction. The centering member has first means for centering a disc having a relatively small central aperture on the turntable, and second means for centering a disc having a relatively large central aperture on the turntable.

It is preferred that the centering member comprises a circular plate portion disposed coaxially with the rotation shaft of the drive motor, and an annular rib portion concentrically formed on one face of the circular plate portion. The first means may be the outer peripheral face of the annular rib portion of the centering member, and the second means may be the peripheral face of the circular plate portion of the centering member.

It is also preferred that the outer peripheral face of the annular rib portion tapers toward the top face of the annular rib portion, and the peripheral face of the circular plate portion tapers toward the one face of the circular plate portion.

Preferably, the centering member freely fits around the end portion of the rotation shaft for axial movement. Also, the turntable preferably includes a table body, and urging means. The table body is fixed around that portion of the rotation shaft of the drive motor between the centering member and the chassis, and has a hollow opening toward the centering member for receiving the circular plate portion of the centering member. The urging means biases the centering member away from the table body to keep the centering member out of the hollow of the table body.

Clamping means may be included in the disc player. It faces the turntable for clamping the disc in cooperation with the table body of the turntable. Relative to the turntable, the clamping means is axially movable between a clamping position where the clamping means clamps the disc and a releasing position where the clamping means unclamps the disc.

Another aspect of the present invention is directed to a disc player comprising, a single turntable for supporting an information carrier disc, a single drive motor directly connected to the turntable for rotating the turntable, and reproducing means for reading signals recorded on the disc. The reproducing means is radially transferrable relative to the turntable. The turntable has a top face on which the disc is to be placed, and a bottom face facing the drive motor. The peripheral face of the turntable tapers toward the drive motor so that the diameter of the turntable decreases gradually from the top face of the turntable to the bottom face. The largest diameter of the turntable is slightly smaller than the inner diameter of the information area of the disc. Therefore, when the reproducing means is transferred to its innermost position where it reads the signals recorded on an inner periphery of the information area of the disc, it is positioned in close proximity to the turntable without butting against the turntable.

It is preferred that the turntable includes a centering member of a unitary construction. The centering member has first means for centering a disc having a relatively small central aperture on the turntable, and second means for centering a disc having a relatively large central aperture on the turntable.

BRIEF DESCRIPTION OF THE DRAWINGS

In the drawings:

FIG. 9 is an enlarged bottom view of a leaf spring in FIG. 5;

FIG. 10 is a fragmentary cross-sectional view of video and audio discs to be played by the disc player in FIG. 3;

FIG. 11 is a fragmentary cross-sectional view of the disc player in FIG. 3 with its stabilizer kept in the clamping position;

FIG. 12 is an enlarged cross-sectional view of the turntable and the stabilizer in FIG. 11, showing a centering plate of the turntable received in a hollow of a table body of the turntable; and FIG. 13 is an enlarged cross-sectional view of a modified form of the turntable in FIG. 5.

DETAILED DESCRIPTION OF THE PREFERRED EMBODIMENT

Figure 1:
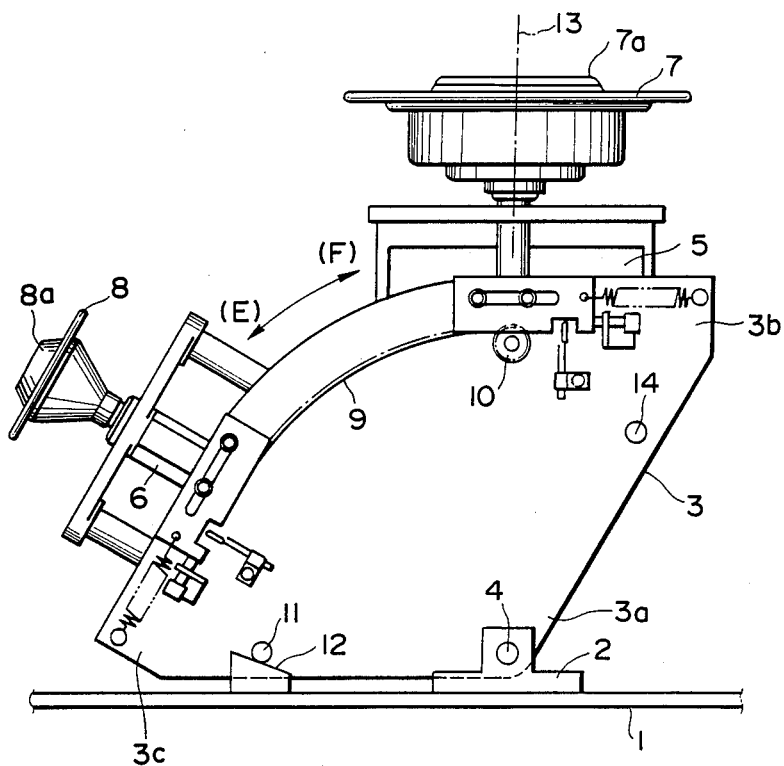
FIG. 1 is a fragmentary side-elevational view of a conventional disc player.
Figure 2:
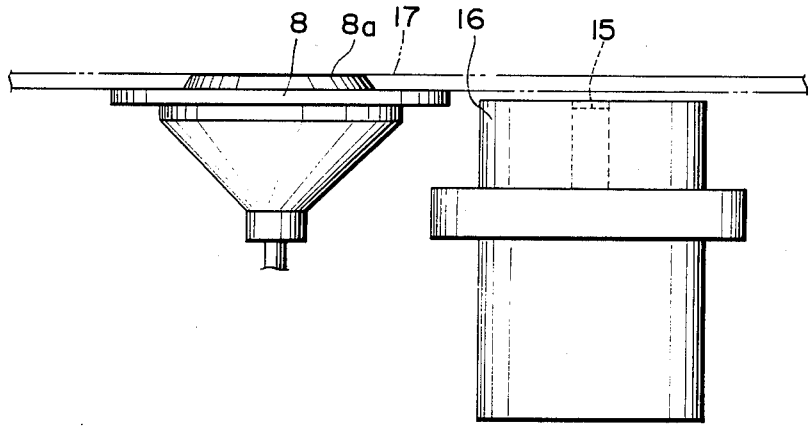
FIG. 2 is an enlarged front view of one of turntables in FIG. 1 and a reproducing head when it has been transferred close to the turntable.
Figure 3:
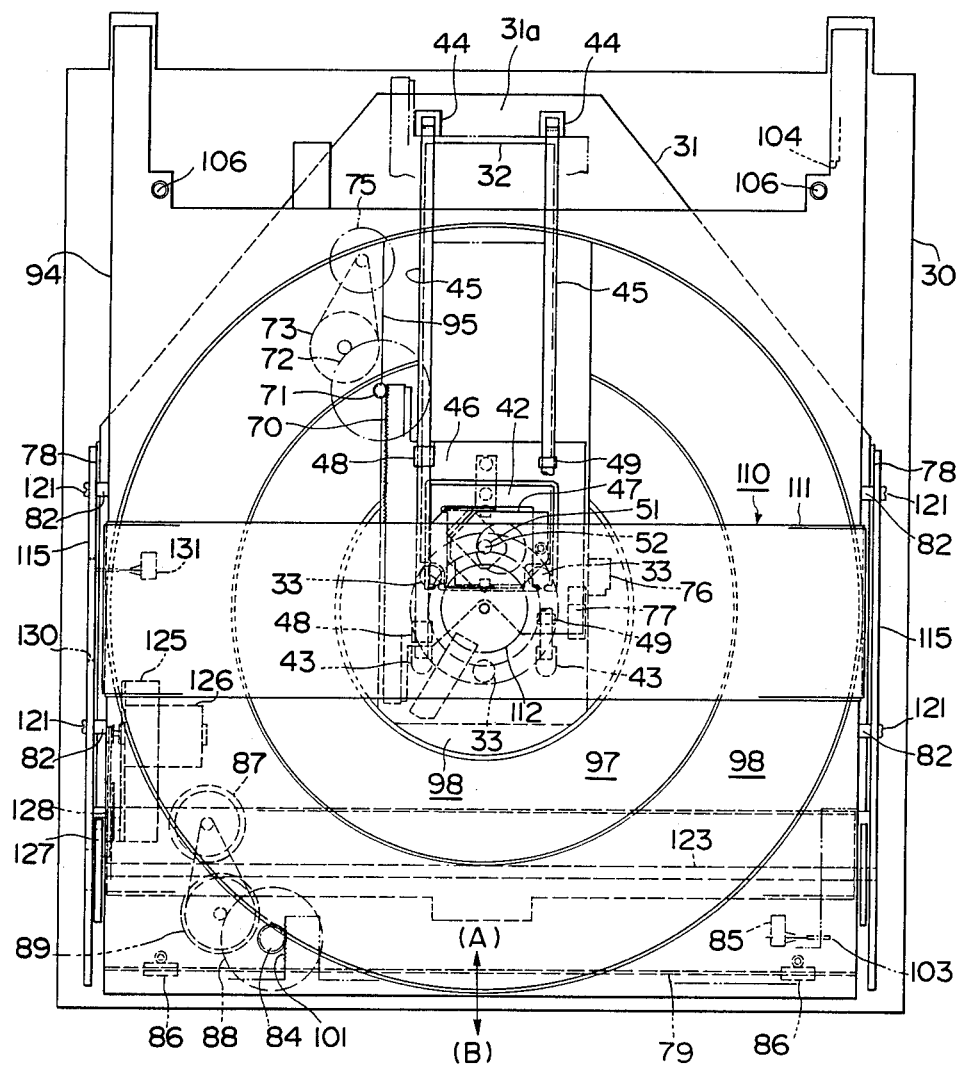
FIG. 3 is a plan view of a disc player according to the present invention with its housing schematically illustrated.
Figure 4:
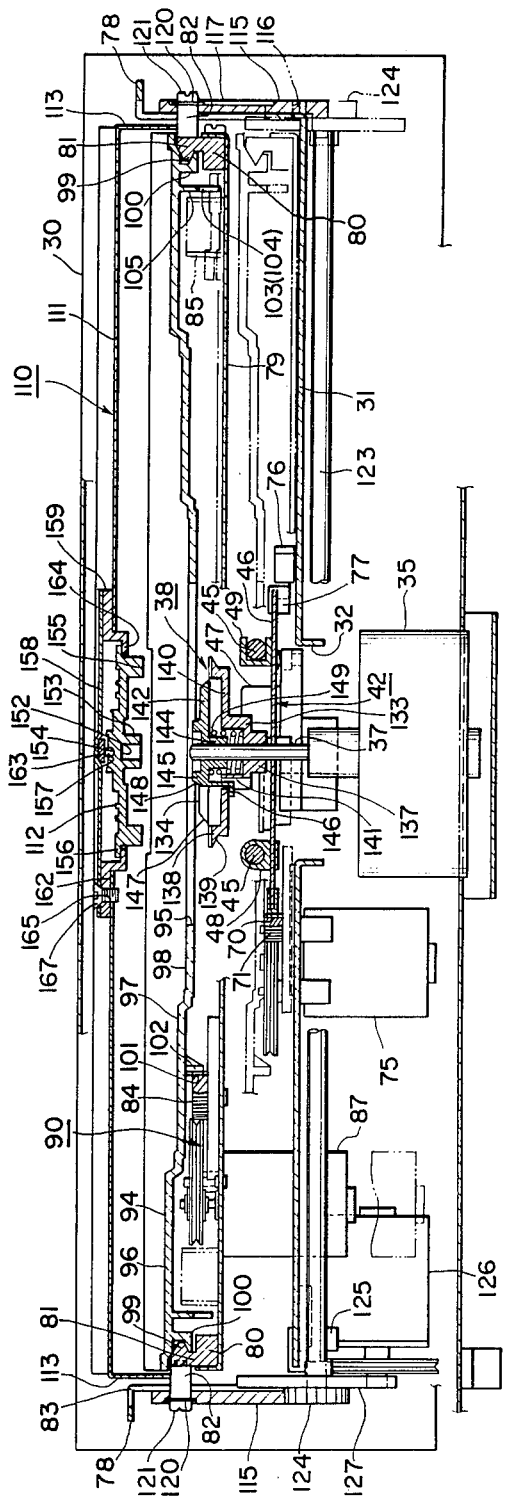
FIG. 4 is a cross-sectional view of the disc player in FIG. 3.

FIGS. 3 and 4 illustrate a disc player according to the present invention, for playing both video discs and digital audio discs.

Figure 5:
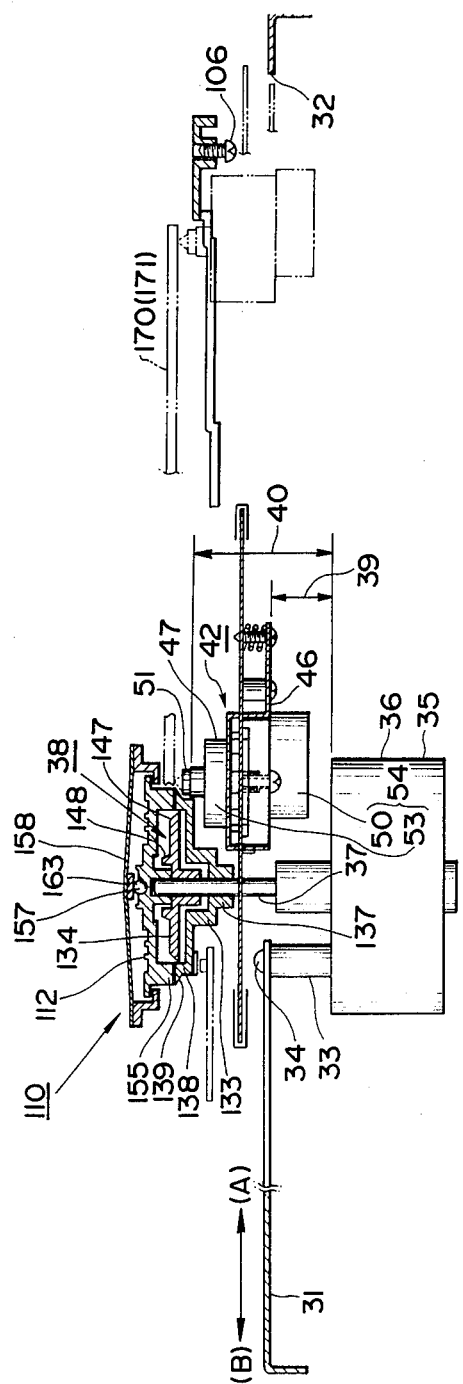
FIG. 5 is a schematic cross-sectional view of the disc player in FIG. 3, mainly showing a turntable, a stabilizer, reproducing head device and a drive motor.

In FIGS. 3 and 4, reference numeral 30 designates a housing of the disc player in which a chassis 31 is disposed. The chassis 31 has an elongated opening 32 extending from its central portion to its rear portion 31a, for allowing a reproducing head device 42 to move within it. As shown in FIG. 5, a drive motor 35 is attached via spacers 33 to the central portion of the lower face of the chassis 31 by means of screws 34. The drive motor 35 has rotating characteristics suitable for rotating both the video discs and the digital audio discs. The motor 35 includes a motor body 36 positioned below the chassis 31 and a rotation shaft 37 extending upwards from the body 36 over the upper face of the chassis 31. The rotation shaft 37 has a turntable 38 fixedly attached around its upper end portion. Due to the spacers 33, a clearance 39 is maintained between the chassis 31 and the motor body 36, which increases the width of a clearance 40 between the turntable 38 and the motor body 36. As a result, the clearance 40 obtains a width larger than the height of the reproducing head device 42, thus preventing the head device 42 from butting against both the turntable 38 and the motor body 36 when the head device 42 is transferred to its innermost position as shown in FIG. 5, where the head device 42 begins the detecting operations.

Returning to FIG. 3, the chassis 31 has two pairs of mount projections 43, 43, 44 and 44, each pair 43 and 44 being formed on the upper face of the chassis 31 in the vicinity of the opposite ends of the opening 32. These projections 43 and 44 are made of synthetic resin through the process of outsert molding. Each pair of mount projections 43 and 44 hold a guide rod 45 bridging the distance between the projections 43 and 44. In other words, a pair of guide rods 45 are disposed parallel to each other along the opposite side-walls defining the opening 32. The reproducing head device 42 is freely attached to these guide rods 45 for backward and forward movement, that is, the movement in the direction indicated by the double-headed arrow (A)(B) in FIG. 3. The head device 42 includes a base plate 46 and a reproducing head 47 mounted on the base plate 46. The base plate 46 has four sliders 48, 48, 49 and 49 wherein the sliders 48 and 48 slidably fit around one of the guide rod 45, and the other sliders 49 and 49 are slidably engaged with the other guide rod 45 (see FIG. 6).

Figure 6:
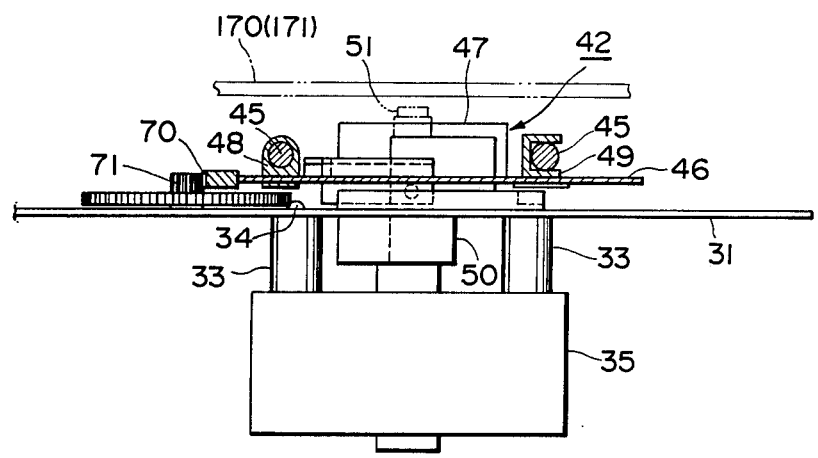
FIG. 6 is an enlarged front view of the reproducing head device and the drive motor in FIG. 5.
Figure 7:
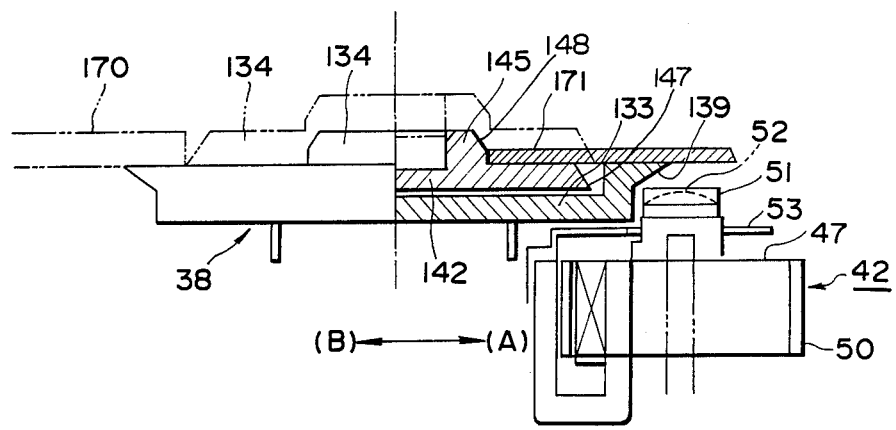
FIG. 7 is an enlarged side-elevational view partly in section of the turntable and the reproducing head in FIG. 5.

As shown in FIGS. 5, 6 and 7, the reproducing head 47 includes a head body 50 having a signal detecting section, a lens-barrel 51 projecting upwards from the head body 50, an objective lens 52 attached to the upper end of the lens-barrel 51, and an enclosure 53 mounted on the head body 50 for covering the lower portion of the lens-barrel 51. The enclosure 53 and the head body 50 constitute the main section 54 of the reproducing head device 42. The upper portion of the reproducing head 47 including the lens-barrel 51 and enclosure 53, protrudes over the chassis 31, but its lower portion, i.e., the head body 50 is located in the opening 32 and projects below the chassis 31.

Returning again to FIG. 3, the base plate 46 has a rack 70 formed in one of its side faces with the teeth of the rack 70 aligned parallel to the guide rods 45. A pinion 71 engaged with the rack 70 is rotatably supported by the chassis 31 with its axis substantially perpendicular to the chassis 31. This pinion 71 is connected via gears 72 and 73 to a motor 75 which is fixed to the chassis 31. Thus, when the motor 75 is actuated, the pinion 71 is rotated, transferring the reproducing head device 42 backwards or forwards along the guide rods 45.

A limit switch 76 for limiting the movement of the head device 42 is provided on the upper face of the chassis 31 at the right side (in FIG. 3) of the opening 32. An engaging piece 77, that is, a piece of synthetic resin formed through an outsert molding process is mounted on the base plate 46 so that it engages with the limit switch 76 when the head device is moved into its innermost position. In other words, the limit switch 76 detects the head device 42 being in its innermost position when the engaging piece is engaged with the limit switch 76.

As shown in FIG. 4, the chassis 31 has a pair of side wall portions 78 protruding vertically from its opposite side edges. Each of the side wall portions 78 has a plurality of through slots 83 (see FIG. 8), each extending vertically. Between these side wall portions 78 of the chassis 31 and in front of the turntable 38, a tray holder 79 is arranged. This tray holder 79 is a rectangular plate having a pair of guide rails 80 disposed on its upper face and along its opposite side edges. Each of the guide rails 80 has a ridge 81 formed and projecting from its inner face, and a plurality of pins 82 projecting from its outer face. The pins of each guide rail 80 loosely pass through the corresponding slots 83 of the corresponding side wall portion 78 of the chassis 31, and thus the tray holder 79 can move upwards and downwards within the range of the length of a slot 83.

Referring to FIGS. 3 and 4, the tray holder 79 is provided on its left-front portion with a loading pinion 84 which is rotatable about an axis perpendicular to the holder 79. This pinion 84 is connected via gears 88 and 89 to the loading motor 87 fixed to the tray holder 79. The tray holder 79 is also provided on its right-front portion with a loading limit switch 85, and at both its right and left-front edges with stoppers 86 projecting upwards.

A tray 94, that is, a substantially rectangular plate for carrying a information carrier disc, is supported over the tray holder 79. The tray has a pair of ribs 100 and 100 formed along its opposite side edges respectively, and grooves 99 longitudinally formed on the respective outer faces of the ribs 100. The grooves 99 of the tray 94 directly receive the respective ridges 81 of the guide rails 80. Thus, the tray 94 is slidably connected with the tray holder 79 so as to move forward and backward relative to the tray holder 79. The tray 94 has another rib 102 on the left side portion of its lower face, and a rack 101 formed on the outer face of the rib 102. The rack 101 is engaged with the loading pinion 84 of the tray holder 79. Still another rib 105 is formed on the lower face of the tray 94 along the rib 100 on the right side. This rib 105 is provided at both its front and rear ends with engaging portions 103 and 104 projecting downwards for engaging with the loading limit switch 85 of the tray holder 79. At right and left-rear edges of the tray 94, a pair of engaging projections 106, i.e., the screws in FIG. 3, are attached so as to project downwards. Accordingly, when the loading motor 87 is actuated, the tray 94 is transferred, for instance, from its retracted position shown in FIG. 3, forward to its ejected position where the main part of the tray is out of the housing 30. Then, the rear engaging portion 104 of the tray 94 contacts with the actuator of the limit switch 85 on the tray holder 79, causing the limit switch 85 to detect the tray 94 in its ejected position. In this ejected position, the engaging projections 106 of the tray 94 engage with the respective stoppers 86 of the tray holder 79 to prevent the tray 94 from disconnecting from the tray holder 79. On the other hand, when the tray 94 is transferred from the ejected position backward to the retracted position, the front engaging portion 103 of the tray 94 contacts with the actuator of the limit switch 85, and the limit switch 85 detects the tray 94 in its retracted position.

The tray 94 has an opening 95 extending from its central portion to its rear portion. This opening 95 allows the turntable 38 to pass through the tray 94 and to project over the tray 94, therefore preventing the tray 94 from butting against the turntable 38 even when the tray 94 is transferred forward or backward along the guide rails 80. On the tray 94, three circular recesses 96, 97, 98 are concentrically formed for the setting of different types of information carrier discs. The largest recess 96 is formed for a video disc having a diameter of 30 centimeters. The second largest recess 97 is formed in the largest recess 96, a predetermined level deeper than the same for a video disc having a diameter of 20 centimeters. The smallest recess 98 is formed in the second largest recess 97, a predetermined level deeper than the same for a digital audio disc having a diameter if 12 centimeters.

A clamper 110 is arranged over the tray 94 for clamping an information carrier disc in cooperation with the turntable 38. This clamper 110 includes a tie plate 111 bridging the distance between the guide rails 80 of the tray holder 79, a disc-shaped stabilizer 112 mounted on the tie plate 111 at a position directly above the turntable 38, and a disc-shaped leaf spring 158 disposed over the stabilizer 112. The tie plate 111 has its opposite end portions 113 bent downwards and attached at the opposite end portions to the guide rails 80 and 80 respectively. This tie plate 111 is provided at its intermediate portion with a ring-shaped holder 159 in which the stabilizer 112 is received with its periphery 156 engaged with an inner flange 164 formed on the inner face of the holder 159. The stabilizer 112 has a cylindrical portion 153 formed at the center of its lower face, and a clamping rib portion 155 circumferentially formed on its lower face in the vicinity of its periphery. The cylindrical portion 153 has a hollow 152 which opens downward for centering the stabilizer 112 on an information carrier disc by receiving the upper end of the rotation shaft 37. The stabilizer 112 also has a bore 154 formed in the center of its upper face, and in this bore 154, a steel ball 157 is received. As shown in FIG. 9, the leaf spring 158 has a recess 160 in the center of its lower face, a pressing plate piece 163 received in the recess 160, and four meandering slits 161 formed through it and surrounding the recess 160. This leaf spring 158 is attached at its periphery to the periphery of the holder 159 by a plurality of screws 167, and by these same screws 167, both the spring 158 and the holder 159 are attached to the tie plate 111. In this arrangement of the clamper 110, the spring 158 has its plate piece 163 in contact with the steel ball 157 of the stabilizer 112, thereby urging the stabilizer 112 downwards. The stabilizer 112 is held between the leaf spring 158 and the holder 159 so as to be rotatable about an axis substantially coinciding with the axis of the rotation shaft 37 of the drive motor 35.

Figure 8:
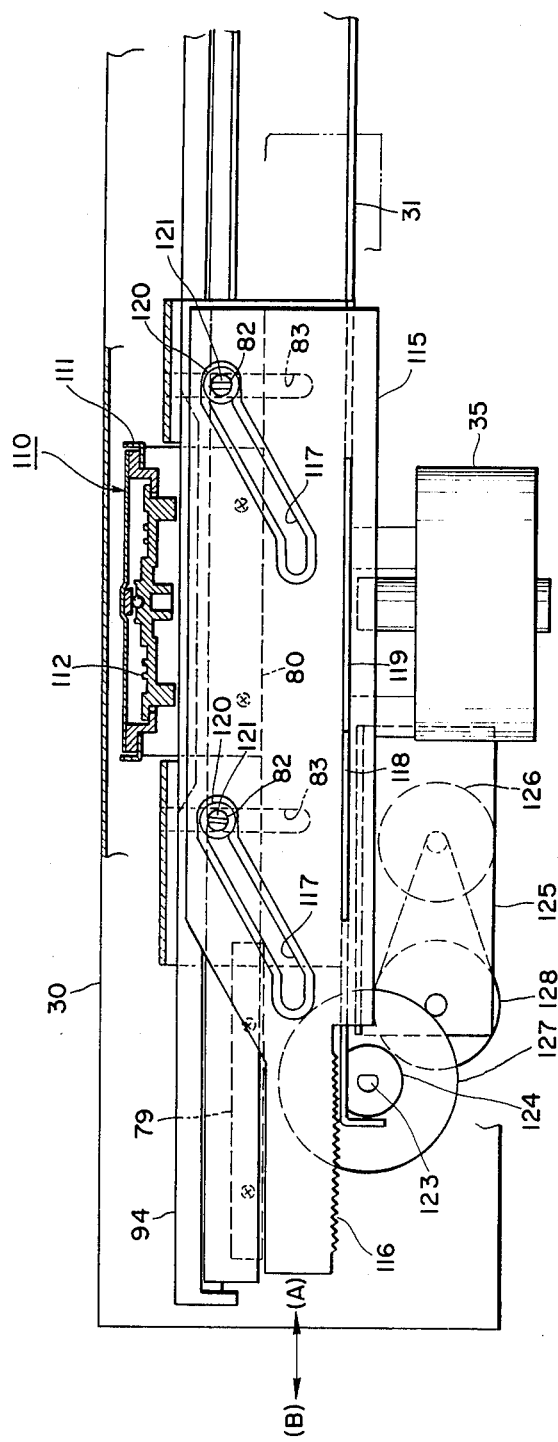
FIG. 8 is a fragmentary side view partly in section of the disc player in FIG. 3.

Returning again to FIGS. 3 and 4, a pair of sliding plates 115 and 115 are disposed parallel and at the outer side of the side wall portions 78 and 78 of the chassis 31 respectively. As illustrated in FIG. 8, each of the sliding plates 115 has a pair of guide slots 117 formed through both its front and rear end portions, and an engaging slit 118 formed in its lower edge portion along the same. Each of the guide slots 117 inclines to a level so that its front end is positioned at a lower level than its rear end. Into these guide slots 117 of each sliding plate 115, those portions of the pins 82 projecting outward from the side wall portion 78 are loosely inserted respectively, and washers 120 are attached to the respective ends of the pins 82 by the screws 121 in order to prevent the corresponding sliding plate 115 from disconnecting from the pins 82. Moreover, an engaging edge 119 projecting outward from the bottom of each side wall portion 78 of the chassis 31 is inserted into the engaging slit 118 of each sliding plate 115. In this construction, the sliding plates 115 are slidable forward and backward relative to the chassis 31.

Each sliding plate 115 also has a rack 116 formed on the front end portion of its lower face. The rack 116 of each sliding plate 115 is meshed with pinion 124. The pinions 124 of the sliding plates 115 are fixed to the opposite ends of a connecting shaft 123 disposed under the chassis 31 going in a transverse direction (see FIG. 4). The chassis 31 is provided on its lower face with a shaft holder (not shown) such as bearings and bushings, and the connecting shaft 123 is supported by the shaft holder so that it can rotate about its axis. The chassis 31 is also provided on its lower face with a mount bracket 125 to which a motor 126 for rotating the pinions 124 is attached. This motor 126 is connected to the pinions 124 via gears 127 and 128. Accordingly, the sliding plates 115 are transferred backward or forward, when the motor 126 is actuated. When the sliding plates 115 are transferred from their foremost position shown in FIG. 8 backward to their backmost position, the pins 82 of the tray holder 79 are transferred downward, guided by the guide slots 117. This results in the simultaneous downward movement of the tray holder 79, the tray 94 and the clamper 110 to their lowermost position. On the other hand, when the plates 115 are transferred from the backmost position forward to the foremost position, the tray holder 79 and the others 94 and 110 are lifted to their uppermost position shown in FIG. 8.

As shown in FIG. 3, the sliding plate 115 on the left side has a slit 130 extending in the direction indicated by the arrow (A)(B). The length of this slit 130 is generally as long as the range of the sliding movement of the sliding plate 115. A limit switch 131 is attached to the left side portion of the chassis 31. This limit switch 131 is inserted at its actuator into the slit 130 of the sliding plate 115 in order to detect the sliding plate 115 being in its foremost and backmost positions, in other words, to detect the tray holder 79 and the others 94 and 110 being in their upper and lowermost positions. The limit switch 131 detects the tray holder 79 and the others when either of the end walls of the slit 130 of the sliding plate 115 is brought into contact with its actuator Returning to FIGS. 4 and 5, the turntable 38 includes a disc shaped table body 133 fixed to the rotation shaft 37 of the drive motor 35, and a centering plate 134 of a unitary construction, slidably connected to that portion of the shaft 37 over the table body 133 for an axial movement. The table body 133 is provided at the center of its lower face with a boss portion 137 attached around the rotation shaft 37 of the drive motor 35, and at the periphery of its upper face with an annular clamping rib portion 138 not only projecting upwards but also projecting outwards over the periphery of the table body 133. More specifically, the clamping rib 138 has its outer peripheral face 139 tapering downwards so that its outer diameter gradually decreases from top to bottom. The inner diameter and largest outer diameter of the clamping rib 138 are generally equal to the inner and outer diameter of the clamping rib portion 155 of the stabilizer 112 respectively. The inner peripheral face of the clamping rib 138 and the upper face of the table body 133 define a hollow 140 opening upward for receiving the centering plate 134. A through hole 141 is formed in that portion of the table body 133 adjacent to the boss 137. The rotation shaft 37 of the drive motor 35 passes through and projects over the table body 133.

The centering plate 134 has a circular plate portion 142 which is provided at the center of its lower face with a boss 144 coaxially fitting around the end of the rotation shaft 37. The centering plate 134 also has an annular engaging rib portion 145 coaxially formed on the upper face of the circular plate portion 142. The peripheral face 147 of the circular plate portion 142 tapers upward, whereby the centering plate centers the video disc on the table body 133 when the peripheral face 147 of the plate portion 142 contacts with the periphery of the central aperture of the video disc. The outer peripheral face 148 of the annular engaging rib portion 145 tapers upward for centering a digital audio disc on the table body 133 when engaging with the periphery of the central aperture of the digital audio disc. The circular plate portion 142 is also provided on its lower face with a hook 146 extending downwards. This hook 146 is inserted into the through hole 141 of the table body 133 and is engaged with the periphery of the through hole 141. This makes a connection between the centering plate 134 and the table body 133, thereby restricting the upward movement of the centering plate 134. A coil spring 149 is interposed between the table body 133 and the centering plate 134. This coil spring urges the centering plate 134 upwards so that the circular plate portion 142 of the centering plate 134 is kept out of the hollow 140 of the table body 133.

FIG. 10 illustrates information carrier discs 170 and 171, which are to be played by the disc player having the aforementioned construction, in comparison with the turntable 38, and the stabilizer 112 which is in its releasing position, i.e., unclamping position.

The video disc 170 has a central aperture 172, and an annular information area $P_1$ around this aperture 172. The digital audio disc 171 also has a central aperture 173 which is smaller than the aperture 172, and an annular information area $P_2$ around this aperture 173. The inner periphery of each of the information areas $P_1$ and $P_2$ is located at a predetermined radial distance apart from the periphery of the corresponding central aperture. As shown in the drawing, the clamping rib portion 155 of the stabilizer 112 faces the clamping rib 138 of the turntable 38. The inner diameter of each of the clamping ribs 138 and 155 is larger than the diameter of the central aperture 172 of the video disc 170. The outer diameter of each of the clamping ribs 138 and 155 is as large as possible, but smaller than the inner diameter of the information area $P_2$ of the audio disc 171.

The aforementioned limit switches 76, 85 and 131 constitute a part of the control unit (not shown) controlling the whole disc player. This control unit controls the motors 35, 75, 87, 126 and the like in accordance with the output from the corresponding limit switches 76, 85 and 131. Each of the switches 76, 85 and 131 has a pair of fixed contacts arranged at a predetermined distance apart from each other, and an actuator serving as a travelling contact between the fixed contacts. The actuator of each limit switch is brought into contact with one of the corresponding fixed contacts when it is moved in one direction. In turn, the actuator is brought into contact with the other corresponding fixed contact when it is moved in the opposite direction. That is, each limit switch is arranged so that it outputs a detection signal when its actuator is brought into contact with either of its fixed contacts. The control unit is constructed so that it controls the motors 35, 75, 87 and 126 when the actuator of the corresponding limit switch is brought into contact with either of the corresponding fixed contacts due to the movement of the actuator in accordance with the action of the corresponding motor.

When no disc is in the disc player, that is, when the disc player is in a state ready to be used, the tray 94 is retracted into the housing 30 and is kept in its lowermost position. Also, in this state, the reproducing head device 42 is in its innermost position.

In order to start playing either the video disc 170 or the audio disc 171 by using the disc player in the above-mentioned state, the control unit of the player must receive instructions concerning the ejection of the tray 94. When the control unit receives the instructions, it actuates the motor 126, and the torque of the motor 126 is transferred to the pinion 124 via the gears 127 and 128. The rotation of the pinion 124 causes the sliding plates 115 to move forwards. During the forward movement, the guide slots 117 of the sliding plates 115 guide the pins of the tray holder 79 upwards, thereby the tray holder 79, tray 94 and the clamper 110 are simultaneously lifted into their uppermost position. When the sliding plates 115 are brought into their foremost position, the rear end wall of the slit 130 pushes the actuator of the limit switch 131 forward. Thus, the limit switch 131 outputs a detection signal for the control unit, and the control unit turns the motor 126 off and, simultaneously, turns the motor 87 on. The torque of the motor 87 is transferred to the pinion 84 via the gears 88 and 89, resulting in the forward movement, i.e., the ejection of the tray 94. When the tray 94 is transferred into its ejected position, that is, the circular recesses 96, 97 and 98 of the tray 94 are exposed out side the housing 30, the rear engaging portion 104 of the tray engages with the actuator of the limit switch 85. Thus, the control unit turns off the motor 87 in accordance with a detection signal outputted from the limit switch 85.

Next, either the disc 170 or the disc 171 is placed in the proper recess 96, 97 or 98 of the tray 94, and the instructions for retracting the tray 94 are given to the control unit. Then, the motor 87 is actuated to rotate the pinion 84 in the reverse direction, whereby the tray 94 is moved backwards, retracting into the housing 30. Instead of the instructions for retraction, manual assistance may be given to the tray 94 to push it backwards. When the tray is pushed, the rear engaging portion 104 of the tray 94 disengages from the actuator of the limit switch 85. Then, the actuator of the limit switch 85 leaves the corresponding fixed contact by its own stability. Therefore, the control unit actuates the motor 87 in the same manner as when it receives the instructions.

When the tray 94 is brought into its retracted position in which the center line of the recesses 96, 97 and 98 coincides with the axis of the turntable 38, the front engaging portion 103 of the tray 94 contacts with the actuator of the limit switch 85. Thus, in accordance with the detection signal from the limit switch 85, the control unit turns the motor 87 off and actuates the motor 126. The actuated motor 126 causes the pinions 124 to rotate in the reverse direction, thereby the sliding plates 115 are moved backwards. This results in the simultaneous downward movement of the tray holder 79, tray 94 and the clamper 110. In the middle of the downward movement of the tray 94, the disc on the tray 94 is transferred onto the turntable 38, and subsequently the stabilizer 112 of the clamper 110 is brought into contact with the disc to bias the disc downwards against the turntable 38.

Then, in case of the video disc 170, the whole centering plate 134 fits into the central aperture 172 of the disc 170, hence the disc 170 is centered on the table body 133 by the tapered peripheral face 147 of the centering plate 134 engaging with the inner periphery of the disc 170. In case of the digital audio disc 171, the engaging rib 145 of the centering plate 134 fits into the central aperture 173 of the disc 171, therefore the disc 171 is centered on the table body 133 by the tapered outer peripheral face 148 of the engaging rib 145 which engages with the periphery of the central aperture 173. Eventually, the tray holder 79 and the others 94 and 110 are brought into their lowermost position, and then the stabilizer 112 of the clamper 110 clamps the disc 170 or 171 in cooperation with the table body 133 of the turntable 38. In case of the video disc 170, as shown in FIG. 11, the disc 170 is clamped between the clamping rib 155 of the stabilizer 112 and the clamping rib 138 of the table body 133. In case of the digital audio disc 171, the disc 171 is clamped, as shown in FIG. 12, between the clamping ribs 155 and 138. When the stabilizer 112 clamps the audio disc 171, the centering plate 134 is forced by the disc 171 into the hollow 140 of the table body 133, thus the circular plate portion 142 of the centering plate 134 is received in the hollow 140. The clamping force for the disc is generated mainly by the leaf spring 158 of the clamper 110, and therefore the thicker disc receives more clamping force.

When the tray holder 79, tray 94 and the clamper 110 are transferred to their lowermost position, the front end wall of the slit 130 of the sliding plate 115 pushes the actuator of the limit switch 131 backward. Thus, the limit switch 131 outputs the detection signal for the control unit, and the control unit turns the motor 126 off. Thus, the loading of the disc is completed.

Thereafter, the instructions regarding the reproduction of the signals are given to the control unit. In accordance with the instructions, the control unit actuates the drive motor 35, and thus the turntable 38 is rotated together with the disc and the stabilizer 112. At the same time, the motor 75 is also actuated in order to send the head device 42 to the position where the reproducing head 47 of the head device 42 can read the address information recorded on the disc. Then, in accordance with the address information read by the reproducing head 47, the reproducing head 47 is transferred to the position under the information area of the disc. Subsequently, the head device 42 is gradually moved backward, i.e., radially outward relative to the disc, and the reproducing head 47 meanwhile reads the signals recorded on the disc. Thus, the signals on the disc are reproduced.

When the reproducing head 47 detects the end of the information area, that is, the end of the track on the disc after the completion of the reproduction, or when the control unit receives instructions for stopping the reproduction, the control unit actuates the motor 75 to rotate the pinion 71 in the reverse direction, causing the head device 42 to move forward. When the head device 42 is brought to its innermost position, the engaging piece 77 on the base plate 46 contacts with the actuator of the limit switch 76, thereby, according to the detection signal from the limit switch 76, the control unit turns the motor 75 off.

Meanwhile, the control unit turns the motor 126 on, to rotate the pinions 124 so that the sliding plates 115 are transferred forward. Due to the forward movement of the sliding plates 115, the tray holder 79 and the others 94 and 110 move upward simultaneously and thus the stabilizer 112 releases the disc. During this upward movement of the tray holder 79 and the others, the disc on the turntable 38 is transferred onto the tray 94. The tray holder 79 and the others 94 and 110, then, reach their uppermost position, and thus the limit switch 131 outputs the detection signal for the control unit. The tray 94 is, thereafter, transferred to its ejected position in the same manner as described previously. After removing the disc from the tray 94, the tray 94 is retracted into the housing 30, and thus the a whole reproducing operation is completed.

In the disc player having the aforementioned construction, the clearances 39 and 40 prevent the head body 50 of the reproducing head 47 from butting against the motor body 36 of the drive motor 35, and also prevent the enclosure 53 of the reproducing head 47 from butting against the turntable 38, even when the reproducing head 47 is transferred to the position directly under the inner periphery of the information area 174 of the audio disc 171. Therefore, it is possible to employ a large drive motor such as the drive motor 35 and a regular sized reproducing head like the reproducing head 47 which have proper performances and characteristics for playing both the video disc and the digital audio disc. Also, the upwardly projecting lens-barrel 51 and the tapered outer peripheral face 139 of the turntable 38 prevent optical and physical interferences between the turntable 38 and the reproducing head 47, thereby, as shown in FIG. 7, enabling the objective lens 52 of the reproducing head 47 to be transferred as near as is possible to the turntable 38 and the disc 171 (or 170), and also enabling the turntable 38 to clamp a wider area of the disc. Furthermore, the single centering plate 134 makes it possible to center both the video and digital audio discs on the turntable 38.

Accordingly, it is possible to produce a disc player having a single turntable for supporting a disc and a single motor for rotating the turntable, and still capable of accepting various information carrier discs having different diameters. Thus, there is produced a disc player which is compact, efficient, simple-structured and uncostly.

In addition, a modified form of the turntable 38 in FIG. 5 is illustrated in FIG. 13, in which the centering plate 134 is provided on its upper face with an annular auxiliary rib 200 surrounding the engaging rib 145. In clamping the digital audio disc 171 with this turntable 202, the auxiliary rib 200 is brought into contact with that portion of the lower face of the disc 171 in the vicinity of the central aperture 173, thus assisting the clamping rib 155 of the stabilizer 112 in clamping it in cooperation with the clamping rib 138 of the table body 133.

It is understood that although preferred embodiment of the present invention has been shown and described, various modifications thereof will be apparent to those skilled in the art, and, accordingly, the scope of the present invention should be defined only by the appended claims and equivalents thereof.

What is claimed is:

1. A disc player for playing various information carrier discs, each having a central aperture, and an annular information area where information signals are recorded, the information area surrounding the central aperture, the disc player comprising:

a single turntable for supporting an information carrier disc;

a single drive motor for rotating the turntable, the drive motor having a motor body and a rotation shaft, and being attached at the rotation shaft directly to the turntable with the motor body spaced apart from the turntable, a first clearance being formed between the motor body and the turntable; and reproducing means for reading signals recorded on the disc, the reproducing means being radially transferrable relative to the turntable, and being positioned in said first clearance without butting against either the motor body or the turntable when the reproducing means is transferred to its innermost position where it reads the signals recorded on an inner periphery of the information area of the disc.

2. A disc player as recited in claim 1, further comprising: a plate-like chassis carrying the motor body on one face thereof, the chassis having an elongated opening extending along the transference route of the reproducing means, the elongated opening allowing the reproducing means to transfer therewithin and also allowing the rotation shaft of the drive motor to pass therethrough so that an end portion of the rotation shaft protrudes over the other face of the chassis and reaches to the turntable; and a spacer member interposed between said one face of the chassis and the motor body, for forming a second clearance between the chassis and the motor body.

3. A disc player as recited in claim 2, wherein the turntable has a top face for placing the disc thereon, a bottom face facing the motor body of the drive motor, and a peripheral face tapering toward the motor body of the drive motor so that the diameter of the turntable decreases gradually from the top face of the turntable to the bottom face thereof, and wherein the largest diameter of the turntable is slightly smaller than the inner diameter of the information area of the disc.

4. A disc player as recited in claim 2, wherein the turntable includes a centering member of a unitary construction, the centering member having first and second means, the first means for centering a disc having a relatively small central aperture on the turntable, and the second means for centering a disc having a relatively large central aperture on the turntable.

5. A disc player as recited in claim 4, wherein the centering member comprises a circular plate portion disposed coaxially with the rotation shaft of the drive motor, and an annular rib portion concentrically formed on one face of the circular plate portion, wherein the first means comprises an outer peripheral face of the annular rib portion of the centering member, and wherein the second means comprises a peripheral face of the circular plate portion of the centering member.

6. A disc player as recited in claim 5, wherein the outer peripheral face of the annular rib portion of the centering member tapers toward a top face of the annular rib portion, and the peripheral face of the circular plate portion of the centering member tapers toward said one face of the circular plate portion.

7. A disc player as recited in claim 6, wherein the centering member freely fits around the end portion of the rotation shaft for axial movement, and wherein the turntable further includes: a table body fixed around that portion of the rotation shaft of the drive motor between the centering member and the chassis, the table body having a hollow, opening toward the centering member for receiving the circular plate portion of the centering member; and urging means for biasing the centering member away from the table body so that the centering member is kept out of the hollow of the table body when no external axial force is exerted on the centering member.

8. A disc player as recited in claim 7, further comprising, clamping means facing the turntable for clamping the disc in cooperation with the table body of the turntable, the clamping means being axially movable relative to the turntable between a clamping position where the clamping means clamps the disc and a releasing position where the clamping means unclamps the disc, and wherein the centering member is disposed between the clamping means and the table body of the turntable.

9. A disc player as recited in claim 8, wherein the table body has a top face at the periphery of the hollow of the turntable for placing the disc thereon, a bottom face facing the motor body of the drive motor, and a peripheral face tapering toward the motor body of the drive motor so that the diameter of the turntable decreases gradually from the top face of the table body to the bottom face thereof, and wherein the largest diameter of the turntable is slightly smaller than the inner diameter of the information area of the disc.

10. A disc player for playing various information carrier discs, each having a central aperture, and an annular information area where information signals are recorded, the information area surrounding the central aperture, the disc player comprising:

a single turntable for supporting an information carrier disc;

a single drive motor directly connected to the turntable for rotating the turntable; and reproducing means for reading signals recorded on the disc, the reproducing means being radially transferrable relative to the turntable, and being positioned in close proximity to the turntable without butting against the turntable when the reproducing means is transferred to its innermost position where it reads the signals recorded on an inner periphery of the information area of the disc, said turntable having, a top face for placing the disc thereon, a bottom face facing the drive motor, and a peripheral face tapering toward the drive motor so that the diameter of the turntable decreases gradually from the top face to the bottom face of the turntable, and wherein the largest diameter of the turntable is slightly smaller than the inner diameter of the information area of the disc.

11. A disc player as recited in claim 10, wherein the turntable includes a centering member of a unitary construction, the centering member having first and second means, the first means for centering a disc having a relatively small central aperture on the turntable, and the second means for centering a disc having a relatively large central aperture on the turntable.

12. A disc player as recited in claim 11, wherein the drive motor comprises a motor body and a rotation shaft attached to the turntable, wherein the centering member comprises a circular plate portion disposed coaxially with the rotation shaft of the drive motor, and an annular rib portion concentrically formed on one face of the circular plate portion, wherein the first means comprises an outer peripheral face of the annular rib portion of the centering member, and wherein the second means comprises a peripheral face of the circular plate portion of the centering member.

13. A disc player as recited in claim 12, wherein the outer peripheral face of the annular rib portion of the centering member tapers toward a top face of the annular rib portion, and the peripheral face of the circular plate portion of the centering member tapers toward said one face of the circular plate portion.

14. A disc player as recited in claim 13, wherein the centering member freely fits around the end portion of the rotation shaft for axial movement, and wherein the turntable further includes: a table body fixed around that portion of the rotation shaft of the drive motor between the centering member and the motor body of the drive motor, the table body having a hollow, opening toward the centering member for receiving the circular plate portion of the centering member; and urging means for biasing the centering member away from the table body so that the centering member is kept out of the hollow of the table body when no external axial force is exerted on the centering member.

15. A disc player as recited in claim 14, further comprising, clamping means facing the turntable for clamping the disc in cooperation with the table body of the turntable, the clamping means being axially movable relative to the turntable between a clamping position where the clamping means clamps the disc and a releasing position where the clamping means unclamps the disc, and wherein the centering member is disposed between the clamping means and the table body of the turntable.

* * * * *